US005438523A

United States Patent [19]

Humm et al.

[11] Patent Number: 5,438,523

[45] Date of Patent: Aug. 1, 1995

[54] APPARATUS FOR STORING AND DELIVERING SALE UNITS

[75] Inventors: Siegfried Humm, Schoental-Westernhausen; Gabor Palosi, Oehringen-Büttelbrown; Karl Weidner, Ingelfingen, all of Germany

[73] Assignee: Adolf Wurth GmbH & Co. KG, Germany

[21] Appl. No.: 259,242

[22] Filed: Jun. 13, 1994

Related U.S. Application Data

[63] Continuation-in-part of Ser. No. 802,890, Dec. 6, 1991, Pat. No. 5,321,625.

[30] Foreign Application Priority Data

Dec. 7, 1990 [DE] Germany ........................ 40 39 166.3

[51] Int. Cl.[6] .............................................. G06F 19/00

[52] U.S. Cl. ........................................ 364/479; 221/7; 221/12; 221/83; 340/825.35

[58] Field of Search ........................ 364/479, 478, 403; 221/2, 5, 7, 8, 9, 12, 13, 14, 83, 90, 154, 155, 76, 77, 129; 235/381; 340/825.35; 194/217

[56] References Cited

U.S. PATENT DOCUMENTS

| | | | |
|---|---|---|---|
| 3,556,284 | 1/1971 | Dyer et al. | 312/97 |
| 3,933,231 | 1/1976 | Vinet | 194/241 |
| 4,412,292 | 10/1983 | Sedam et al. | 364/479 |
| 4,553,211 | 11/1985 | Kawasaki et al. | 364/479 |
| 4,631,357 | 12/1986 | Grunig | 379/40 |
| 4,695,954 | 9/1987 | Rose et al. | 364/479 X |
| 4,722,058 | 1/1988 | Nakayama et al. | 364/479 |
| 4,811,764 | 3/1989 | McLaughlin | 141/98 |
| 4,961,507 | 10/1990 | Higgins | 221/129 |
| 5,025,950 | 6/1991 | Trouteaud et al. | 364/479 X |
| 5,091,713 | 2/1992 | Horne et al. | 364/479 X |
| 5,169,027 | 12/1992 | Falk et al. | 221/2 |
| 5,292,029 | 3/1994 | Pearson | 364/479 X |
| 5,337,920 | 8/1994 | Clausen | 364/479 X |

FOREIGN PATENT DOCUMENTS

| | | |
|---|---|---|
| 0203687 | 7/1989 | European Pat. Off. . |
| 1156665 | 5/1958 | France . |
| 2562293 | 4/1985 | France . |
| 1474786 | 3/1969 | Germany . |
| 1574236 | 6/1971 | Germany . |
| 2447618 | 4/1976 | Germany . |
| 2736197 | 2/1979 | Germany . |
| 2751066 | 10/1979 | Germany . |
| 3048394 | 7/1982 | Germany . |
| 3213119 | 10/1983 | Germany . |
| 3308072 | 3/1984 | Germany . |
| 8508949 | 3/1985 | Germany . |
| 3546598 | 10/1986 | Germany . |
| 3610347 | 10/1987 | Germany . |
| 612024 | 6/1979 | Switzerland . |
| 1565552 | 4/1980 | United Kingdom . |
| 2045989 | 11/1980 | United Kingdom . |

*Primary Examiner*—Joseph Ruggiero
*Attorney, Agent, or Firm*—Quarles & Brady

[57] ABSTRACT

An apparatus is provided for delivering assembly and machining expendable materials or tools. The apparatus has an internal continuous mechanism with different compartment rows arranged in rotary manner and to move past a removal door row. An embodiment having relatively stationary compartments and movable doors to align with a selected compartment is also disclosed. An inputting keyboard for the positioning of the particular compartment row in front of the removal door row also controls the unlocking of a door in the door row associated with the selected compartment. The delivery unit is connected by means of a long-range transmission means to a data processing unit, which records the removal of the materials and optionally initiates reloading, billing, etc.

23 Claims, 6 Drawing Sheets

APPARATUS FOR STORING AND DELIVERING SALE UNITS

CROSS-REFERENCE TO RELATED APPLICATIONS

This application is a Continuation-In-Part of application Ser. No. 07/802,890, filed Dec. 6, 1991, now U.S. Pat. No. 5,321,625. To the extent any disclosure in application Ser. No. 07/802,890, now U.S. Pat. No. 5,321,625 is not expressly stated herein, it is specifically incorporated herein by reference.

BACKGROUND OF THE INVENTION

Assembly and machining expendable materials or tools, e.g., screws, rivets or saw blades, are kept in stock in cabinets or separate stores as a function of the size of the organization processing them. However, quite apart from tying up capital, this also involves stockkeeping and at least certain administrative measures for checking the existing stock and for reordering. Frequently, excessive stocks of certain types are kept, which are finally not used or not used in an optimum manner.

Product selling machines are also known, but are only suitable for delivering a very limited number of different products. In one known automatic selling machine of this type (DE-OS 15 74 236) there are, e.g., eight storage planes, each plane containing identical products.

In another known apparatus of this type (US-A-4 811 764) several rotatable magazines are superimposed, each magazine also containing only a single product.

In addition, mechanical cabinets with a continuous circulatory lift construction are known (DE-C2-30 48 394), in which with the aid of an indicator system, it is indicated in which compartment a desired product is located. This compartment can be moved to a specific removal point. However, in this case, access is always possible simultaneously to a large number of compartments, so that such an apparatus would not be suitable as a product selling machine.

In addition, a product selling or vending machine is known, which is connected by means of a telephone line to a central monitoring location (CH-A5-61 20 24). The latter is able to establish whether the selling machine has a fault or is empty. The goods are constituted by tickets, so that the machine need only have two product types, namely tickets and coins. Before the tickets are removed, they are paid for by feeding in coins.

Also, in the case of bank cash dispensers, the product availability, namely banknotes, is very limited. Admittedly, a debit calculation takes place by means of a control room, but it is only necessary to deduct the value and there is no need to additionally calculate a specific article.

SUMMARY OF THE INVENTION

An object of the invention is therefore to provide an apparatus for storing and delivering sale units not suffering from the disadvantages of the prior art and in particular leading to simplifications with respect to stockkeeping and accessibility for such materials.

The object is achieved by an apparatus for storing and delivering sale units, particularly assembly and machining expendable materials or tools, which have at least one delivery unit connectable to long-range transmission means.

The delivery unit can contain the sale units, e.g., screw boxes, and by means of the long-range transmission means it is possible to monitor the removal and stock from a remote control room or exchange. This leads to a significant simplification relative to stock control and the reloading of the delivery unit. The existing stock can be adapted in an optimum manner to the needs of a particular delivery unit by the control room, and consequently, waiting and procurement times are avoided. There is the additional advantage that the sale units contained in the delivery unit can still be owned by the supplier and the consuming company is only automatically debited by the control room, following the actual removal from the delivery unit. The supplying company can also control the entire stockkeeping operations through its control room and can carry out reloading in accordance with needs and without having to intervene. This also facilitates the decentralized stockkeeping in larger companies, and transportation procedures are avoided. The advantage for the supplier is that sales personnel are relieved of the task of placing routine orders and are more readily available to customers for giving advice in special cases.

In a preferred embodiment, the delivery unit can have a plurality of compartments for optionally different sale units, positioning means in order to move at least one compartment into a delivery position; release means for releasing at least one positioned compartment for removal purposes; as well as signal generating means, which generate signals as a function of the delivery position and the removal; and long-range transmission means transmitting the signals to a data processing unit remote from the delivery unit in which are recorded the removal and the associated delivery position.

In another preferred embodiment, an apparatus for storing and delivering articles includes long-range transmission means. A storage member includes a plurality of compartments for storing articles. At least one delivery unit is operatively connected to the long-range transmission means, and the delivery unit has at least one delivery door arranged on the front side of the delivery unit. A positioning device serves to move the delivery door relative to the plurality of compartments into a delivery position in which one of the compartments is aligned with the delivery door. A release serves to release the door for exposing one of the compartments. A signal generator serves to generate signals indicative of alignment of the compartment with the delivery position and release of the door, and the long-range transmission means for transmitting signals to a remote data processing unit to record the actions.

In other specific aspects, the delivery unit can be constructed in different ways. Preference is given to a continuous circulatory lift-like arrangement of juxtaposed compartment rows. Which can be moved forwards and backwards in motor mariner, so that it can be very rapidly moved into the correct position following a pre-selection, e.g., based on a color code and precise positioning via a number system. One of several juxtaposed doors can be unlocked, so that the selected compartment can be opened. However, it can also be controlled in such a way that a release only takes place when the delivery unit receives a release instruction from the control room and, e.g., the compartment actually contains a sale unit. The removal, e.g., the door opening and/or closing, generates a signal which, together with the basic data of the delivery unit and the position coding of the corresponding compartment, is recorded in the control room where it updates stock and billing data banks.

Reloading of the delivery unit can take place at regular intervals or also as a function of consumption. The delivery unit loader can bring the unit into a loading position, so that stock replenishment can be recorded in a similar way by long-range transmission.

The compartments of the delivery unit can, e.g., have a greater depth than the normal sale unit, so that conventionally two-sale units can be housed therein, which can be removed together. This permits the housing in the compartment of larger sale units, e.g., a pack of saw blades.

The long-range transmission can take place by means of a public data transmission network, e.g., the telephone network. One possibility is so-called TEMEX transmission, which, following corresponding coding of the signals in a remote control unit, transmits them via the telephone network to a tele-TEMEX exchange, which, optionally via a main exchange, transmits them onto the routing desk associated with the data processing unit, where they are recorded. The retransmission of enable or inhibit signals, e.g., in the case where payments have not been made, etc., takes place in the same way.

The apparatus makes it possible to simplify and improve numerous operations. Through the arrangement of a large number of compartments, it is possible by loading several compartments with the same sale units, to solve the problem of different consumption quantities. The positioning device for the compartments and/or the release initiated after positioning has taken place can be made dependent on an access authorization by means of a code number, key, etc. This could even differ for different compartments of the same delivery unit, so that, e.g., certain materials would only be accessible to specific persons. This can control the problem of the wastage or theft of materials.

When several delivery units are connected to the same long-range transmission link, an association is possible by different coding of the means. The control room or exchange can provide the company with the special service of a precise listing of the expendable materials, so that the calculation thereof is facilitated.

By cooperation between the supplier and the company, it is also possible to adapt to changed conditions, in that, e.g., the company, by inputting the standard parts contained in parts lists and the quantities to be manufactured, permits an optimum loading and an immediate adaptation following a modification to planning data. It would also be possible for the company to automate delivery, in that on inputting a specific product characterization on the basis of stored parts list data, only the correct compartments are opened.

BRIEF DESCRIPTION OF THE DRAWINGS

These and further features of the invention can be gathered from the claims, whose wording by reference is made into the content of the description, as well as from the description and drawings, the individual features being realizable either alone or in the form of sub-combinations in an embodiment of the invention and in other fields and can represent advantageous, independently protectable constructions for which protection is hereby claimed. Preferred embodiments of the invention are described hereinafter relative to the drawings, wherein:

DETAILED DISCUSSION OF THE INVENTION

Figure 1:
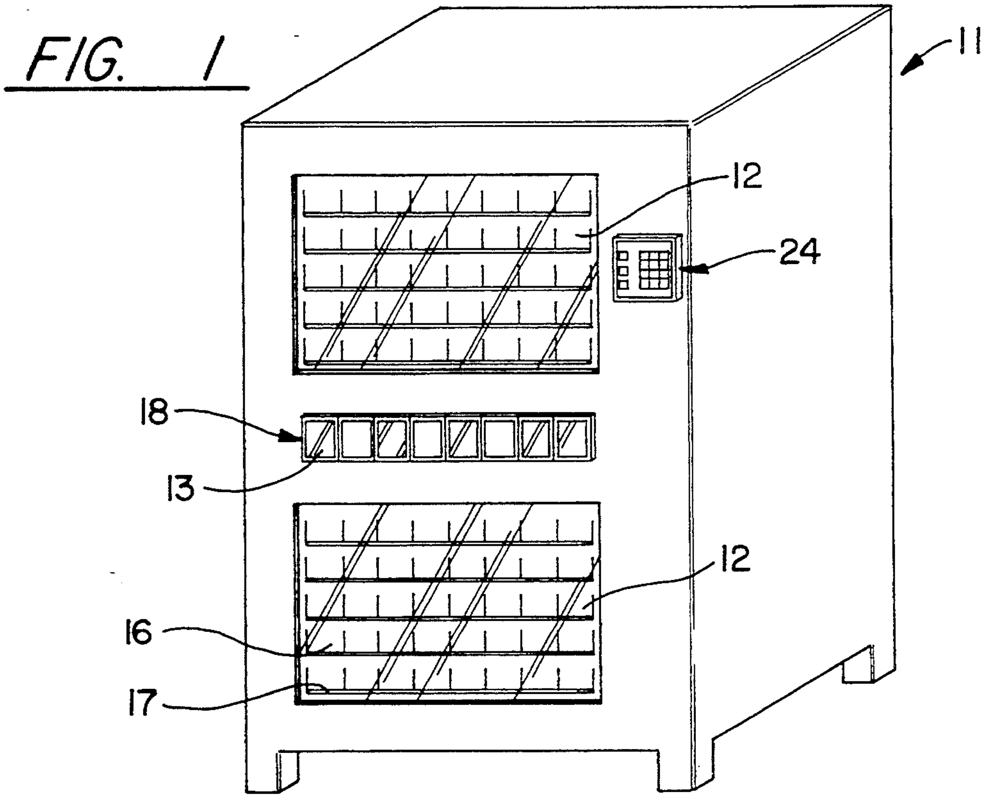
FIG. 1 is a diagrammatic perspective view of a delivery unit.
Figure 4:
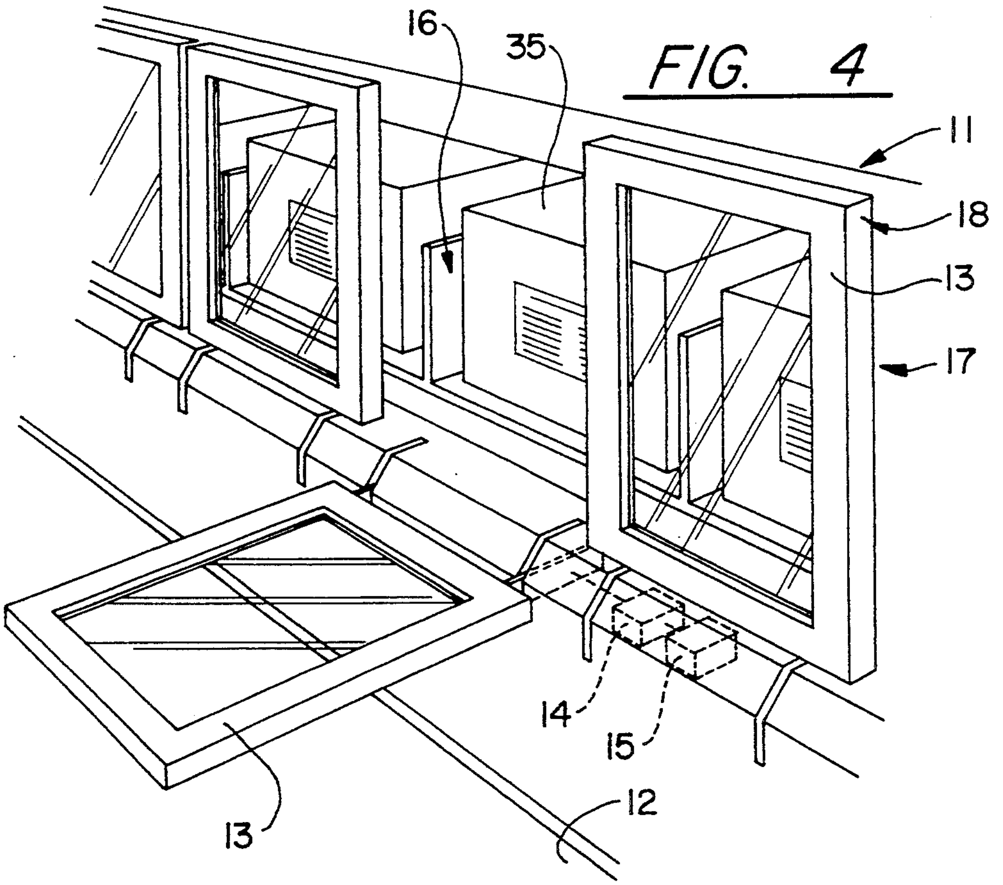
FIG. 4 is a detailed view of a delivery unit.
Figure 5:
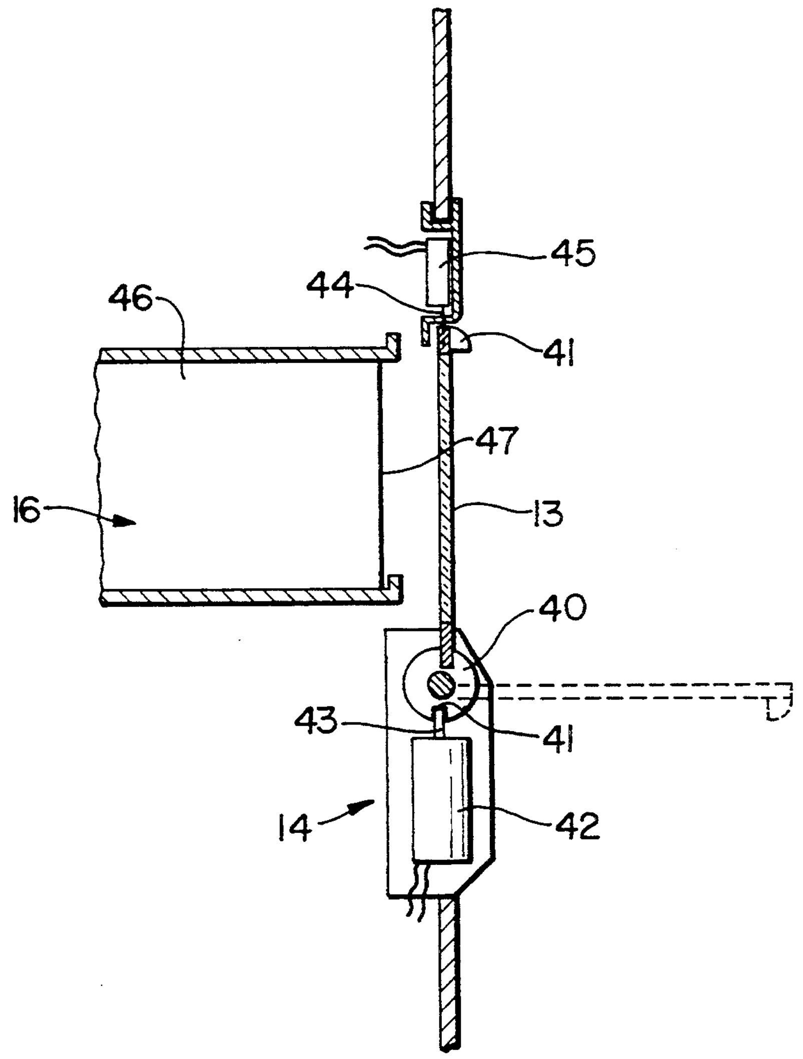
FIG. 5 is a view of the arrangement of a door.

FIG. 1 shows a delivery unit 11 in the form of a cabinet, which is provided on its front with upper and lower viewing and loading doors 12, and in a central, easy removal height, is provided with a plurality of juxtaposed, individually openable removal doors 13 in a row 18. These removal doors 13 which are also visible in FIGS. 4 and 5 are constituted by flaps, which have in a frame a viewing window insert and are pivotable about a horizontal, bottom spindle. They have an electrically operated lock 14 (FIG. 4) located in a concealed axial area of the spindle and which can be mechanically connected to a door signal generator 15 for opening or closing the removal door, e.g., in the form of a magnetic bolt.

Figure 2:
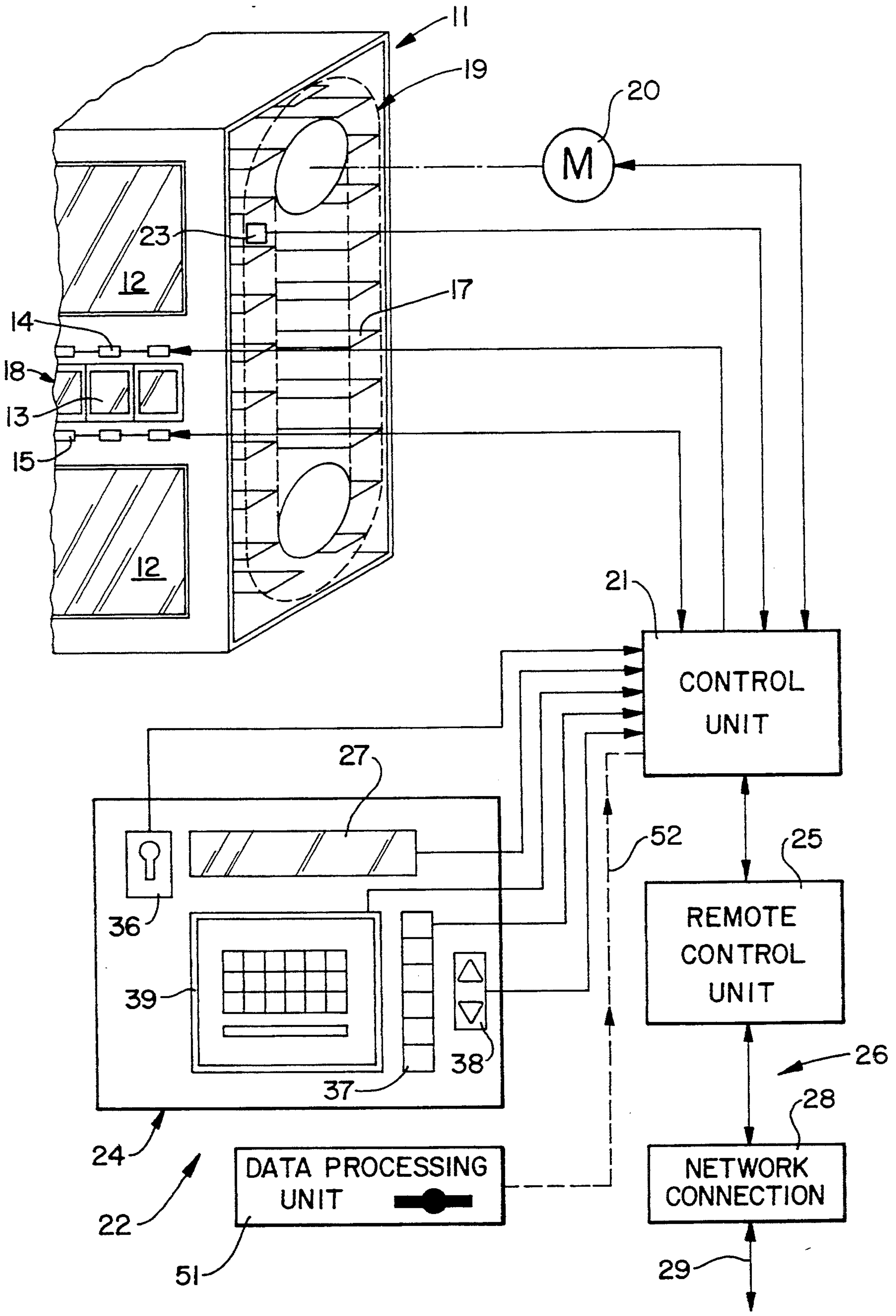
FIG. 2 is a block circuit diagram of a delivery unit and its connection.

Within the delivery unit 11 are provided a plurality of compartments 16 in rows 17 of, e.g., eight juxtaposed compartments. The compartment rows 17 combined to form a unit are fitted to a continuously rotating aft mechanism 19, so that a large number of these rows 17 can be moved past the door row 18. It is, e.g., possible for 24 compartment rows 17 to be located in the delivery unit, which can be brought into the delivery position 18 by a lift mechanism 19 (indicated in FIG. 2) by means of a reversible motor 20. The mechanism and motor, together with a control unit 21 for the lift 9, form positioning means 22. The control unit 21 operates electronically, e.g., with a microcomputer and corresponding electronic or electromechanical output switching elements for controlling the motor, the locking means and the like.

It receives signals from the door signal generators 15, optionally from a row signal generator 23 for the position of the individual compartment rows 17, from a keyboard 24 and from a remote control unit 25, which belongs to the long-range transmission means 26, as well as possibly feedbacks from the motor 20. It supplies signals to a display panel (display) 27 belonging to the keyboard, to the motor, to the locking means 14 and to the remote control unit 25.

Figure 3:
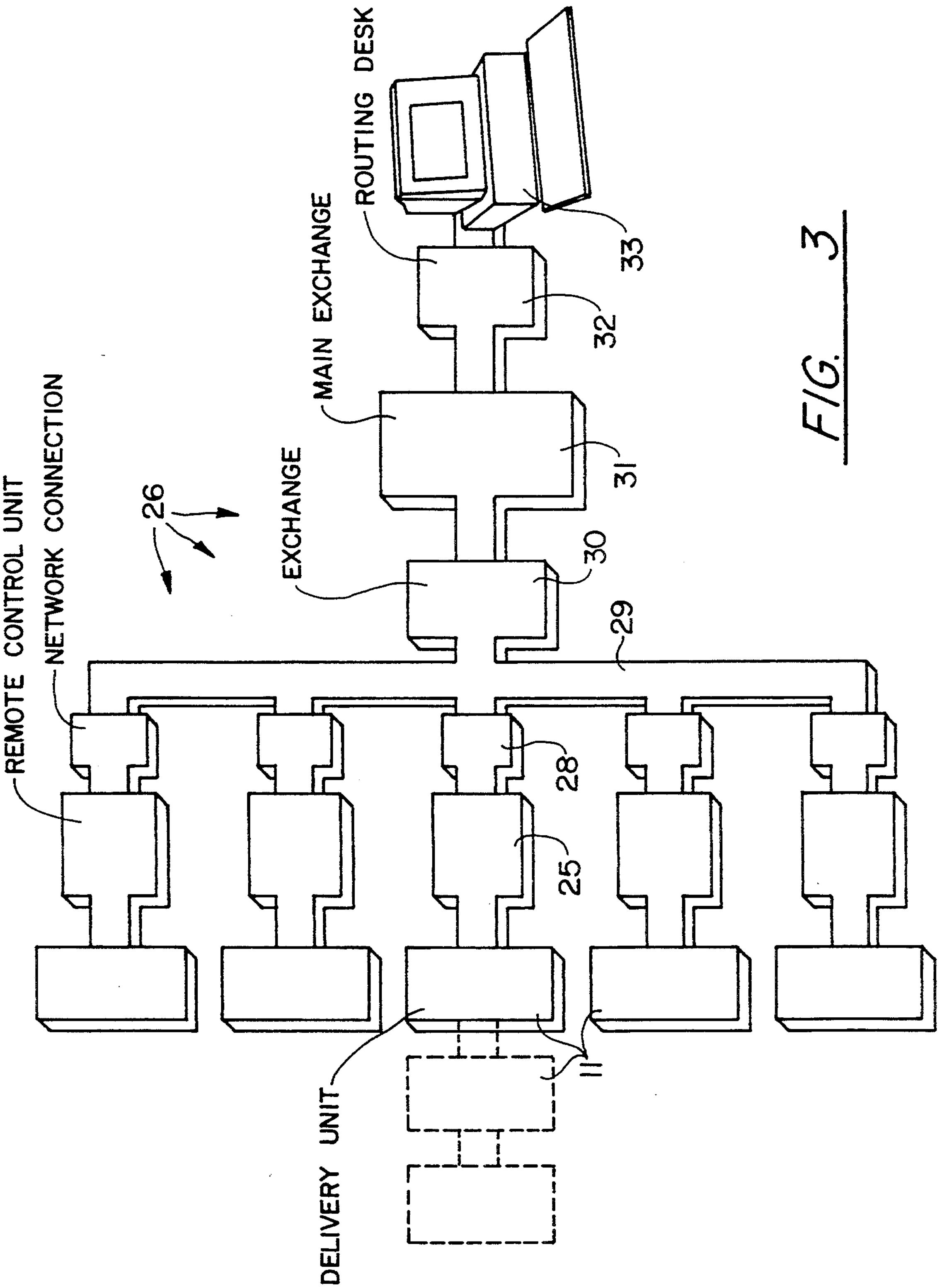
FIG. 3 is a block circuit diagram of several delivery units connected by means of a data network to a data processing central unit.

The long-range transmission means 26 is diagrammatically shown in FIG. 3. Several delivery units 11 are in each case connected by means of a remote control unit 25 to a TEMEX network connection 28, from where they are passed via the normal telephone network 29, a TEMEX exchange 30 and optionally a main TEMEX exchange 31 to the TEMEX routing desk 32 of a supplier through which they are fed into the supplier's data processing unit 33. The signals follow the same route on the return path.

The postal TEMEX system transmits data in a correspondingly coded form via the telephone network. In the same way, the information can also be transmitted by fax or by dialing modems. In addition, several delivery units 11 can be connected to one remote control unit.

The apparatus functions as follows. On the first occasion each delivery unit is loaded with numerous different or also identical sale units, via the upper and lower viewing and loading doors 12, which can be opened, e.g., with a key by the supplier's customer service employee. In each of the, e.g., 192 compartments, which have a considerable depth compared with the width and height, are normally placed two sale packs, e.g., for screws, or a single sale pack for longer articles. Loading takes place according to a specific plan discussed with the customer holding the delivery unit and which is either already contained in the supplier's data processing unit 33, or is inputted by the loading person via a keyboard and is supplied to the same by the long-range transmission means 26. Thus, with each compartment is associated a specific article. Each compartment can contain several packs of the same type or associated articles, e.g., screws and the associated nuts.

If the consumer has a requirement for one of the articles, optionally after the operation of a key-operated switch 36, or the inputting of a code number only known to specific persons, he can operate the delivery unit. He can set the lift mechanism 19 into operation by means of a rough pre-selection 37 in the form of keys for different zones, which are, e.g., marked in color, or by an "upwards-downwards" keyboard 38, so as to bring the corresponding group of articles from which he can make a fine selection into the viewing field (doors 12). He can then make the precise selection by means of the packing inscriptions and by means of a figure keyboard 39 can select the precise number of the compartment. Controlled by the control unit 21, the lift mechanism 19 then moves the compartment row 17 with the desired compartment behind the door row 18 and unlocks, by releasing the locking means 14, those doors behind which is located the compartment with the desired article, while the remaining doors remain locked.

The positioning can also take place without a rough pre-selection, if the consumer already knows the corresponding compartment number, or is provided with it beforehand in some other way, e.g., on a drawing or operating instructions. The motor 20 moves the desired compartment row in the fastest possible way into the desired delivery position either forwards or backwards. It is also possible to provide a connection 50 for an automatic input of position details, e.g., from a data processing unit 51 containing parts list data. For example, the user can directly input the article number.

The control contained in the unit, which not only contains an association between the compartment numbers and the articles, but also knows whether a specific article is still in the compartment ensures that if a compartment is empty, without positioning the compartment the user directly knows that the article is no longer present, which obviously saves time.

The positioning system is stopped at the time of unlocking. The consumer can then open the corresponding compartment and remove the articles contained therein. On closing (or even on opening), the associated signal generator 15 emits a removal signal which, on closing the door, also makes the positioning device operational again. After corresponding conversion and coding in the control unit and in the remote control unit, the removal signal can be passed via the telephone network 29 to the exchange, which only constitutes a switching station and separates the signal from the telephone signals. In the main exchange 31 with the signal is associated a subscriber identification and optionally other data (position, time, etc.), before the correspondingly prepared signal is fed via the routing desk 32 to the supplier's data processing central unit 33. In the latter the signals are processed and in particular the inventory of the particular delivery unit is updated, optionally a reloading indication is given and invoicing takes place. The central unit can also block a specific delivery unit.

It is possible to store the data in the unit and only supply them to the exchange at regular intervals, e.g., twice a week, and this naturally takes place in a program-controlled manner.

The apparatus can also be designed in such a way that the data processing unit 33 only brings about the release of those compartments which, according to the inventory, still contain articles, although this is usually apparent to the consumer. It is generally possible to provide any random long-range transmission.

It is possible for the consumer to change or delete the selection, provided that the removal has not yet been acknowledged by opening the door. For the case of a power failure or a disconnection of the unit for other reasons, the control unit stores the present position or is set up in such a way that on switching on again it automatically moves into a starting position using the shortest route. In the case of filling or maintaining the unit, there is a corresponding notification to the data processing central unit 33 and removal is blocked during the loading process.

Reloading takes place in the following way. At regular intervals the exchange establishes which articles are missing in a specific unit and draws up a resupply order for the missing articles. The supply note contains a list of the subsequently supplied articles, the compartment number being additionally given for each article. The operator identifies himself to the automatic machine by a check card or a secret number and starts to fill the machine. The operator inputs into the operating panel the compartment number located on the supply note, so that the machine being filled positions this compartment number in the removal row and unlocks door 14 associated with the corresponding compartment. The filling person opens this door and slides the article on the supply note through the open door into the compartment and then the door is closed again. On closing the door the automatic machine receives in its control the indication that the particular article is again in the compartment. This is repeated until the operator has worked through the supply note.

According to a further development of the invention, the association between the compartments and the articles stored in a memory can be modified in situ and suitable devices can be provided for this.

The display 24 can also be extended in such a way that it corresponds to a complete display of a standard computer screen, optionally with a complete keyboard. The operator can not only dial the compartment number, but can also directly input the article number. The apparatus can assist him in this, in that it establishes inputting errors.

According to the invention, by inputting the article number of an article not present in the apparatus, it can be ordered from the exchange. For this purpose the apparatus, e.g., on a replaceable floppy disk, contains a list of all articles obtainable from the supplier. This order can be given together with the regularly occurring data communications, so that the ordering company can save the need for a telephone call or a written order. The apparatus can also contain a printer connection or a simple printer, so that on each occasion or on request it can print out a list of orders or also a list of removals. This can be appropriate for associating the removals with the individual cost positions.

This apparatus need not be set up directly on the consumer's premises, but can, e.g., be located in a place accessible to the public, where several users can make use of the apparatus. These users must then identify themselves to the apparatus, e.g., using a check card or the like. In this case the debit calculations apply to the customer who has identified himself by the check card or the like.

FIG. 5 shows in simplified form how a door 13 can be secured against undesired opening. The door 13 is fixed to a shaft 40 mounted in rotary manner. For opening purposes it is necessary to grip a tongue 41. In the closed state of the door 13 it is doubly locked, once in the vicinity of the bottom and once in the vicinity of the top. The shaft 40 contains a bore 41, in which engages a pin 43 operated by an electromagnet 42. The pin 43 is, e.g., subject to the action of a spring, in such a way that it is pressed into the bore 41 when the electromagnet is currentless. In the same way on the top of the door 13 is provided an only diagrammatically indicated pin 44, which also passes into an opening. The pin 44 can be raised by an electromagnet 45. In both cases the pin 43 or 44 is only displaced if the electromagnet 42 or 45 previously disengages a catch or the like.

Electric locking in such a way that only one door 13 can be opened only when the lift system is stationary is carried out by the electronic control of the apparatus.

The individual compartments 16 of each compartment row are separated from one another by partitions 46, which extend up to the front of the cabinet to such an extent that the space between the leading edges 47 of the partitions 46 and the flap of the adjacent door is not sufficient to remove articles from the adjacent compartment 16. Thus, the opened door 13 only gives access to the compartment 16 positioned directly behind it.

If the power supply fails with the door open, the apparatus control ensures that the information at the time of the power failure remains stored, so that working can again take place at the same point when the power supply is reconnected. If the door is closed again during the power failure, it is also ensured that debiting can still take place after reconnection of the power supply.

As a result of the use of a lift a very large number of different products can be housed in a confined space. Through the arrangement of a row of juxtaposed doors 13 corresponding to a lift compartment row, there can be access to the entire lift content. Through the possibility of only being able to open a single door, access is in fact only permitted to a single compartment. Thus, the available space is utilized in an optimum manner and despite the large number of articles only little space is required. This is important for the particular application described here, namely that the automatic machine is held by the consumer, although he does not own the goods and the machine.

Figure 6:
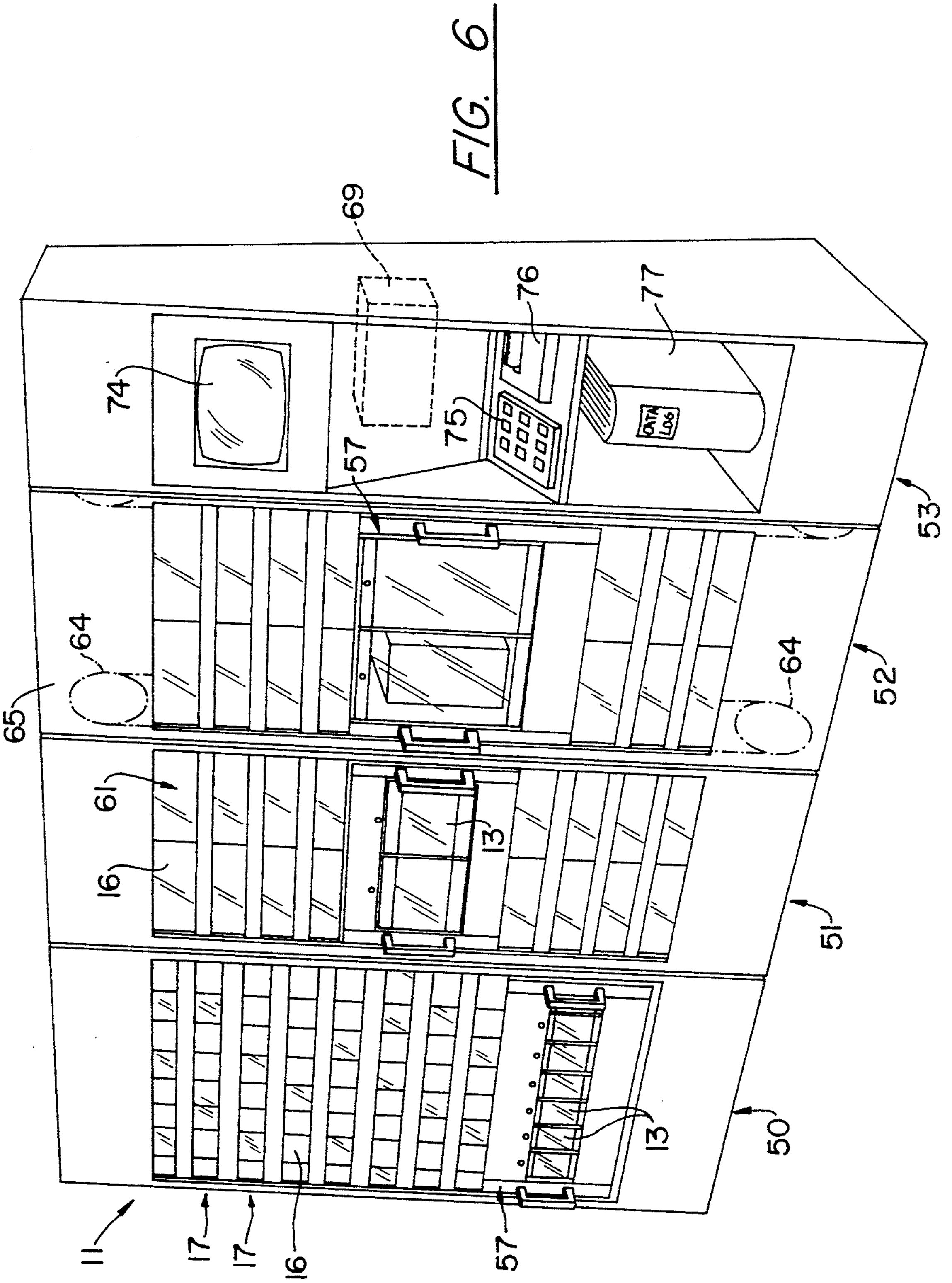
FIG. 6 is a perspective view of another preferred embodiment of the delivery unit.

FIG. 6 shows another preferred embodiment of an apparatus 11 for storing and delivering articles. The apparatus includes several storage units 50, 51 and 52, each in the form of a cabinet, and a control unit 53 of matching construction. The units 50 to 53 are in the form of upright standing cabinets or shelves, the fronts of which are somewhat inclined relative to the backs thereof. The units 50 to 53 are positioned juxtaposed to each other. They are interconnected by electrical wiring for providing power to drives, locks, etc., and for controlling the same.

Figure 7:
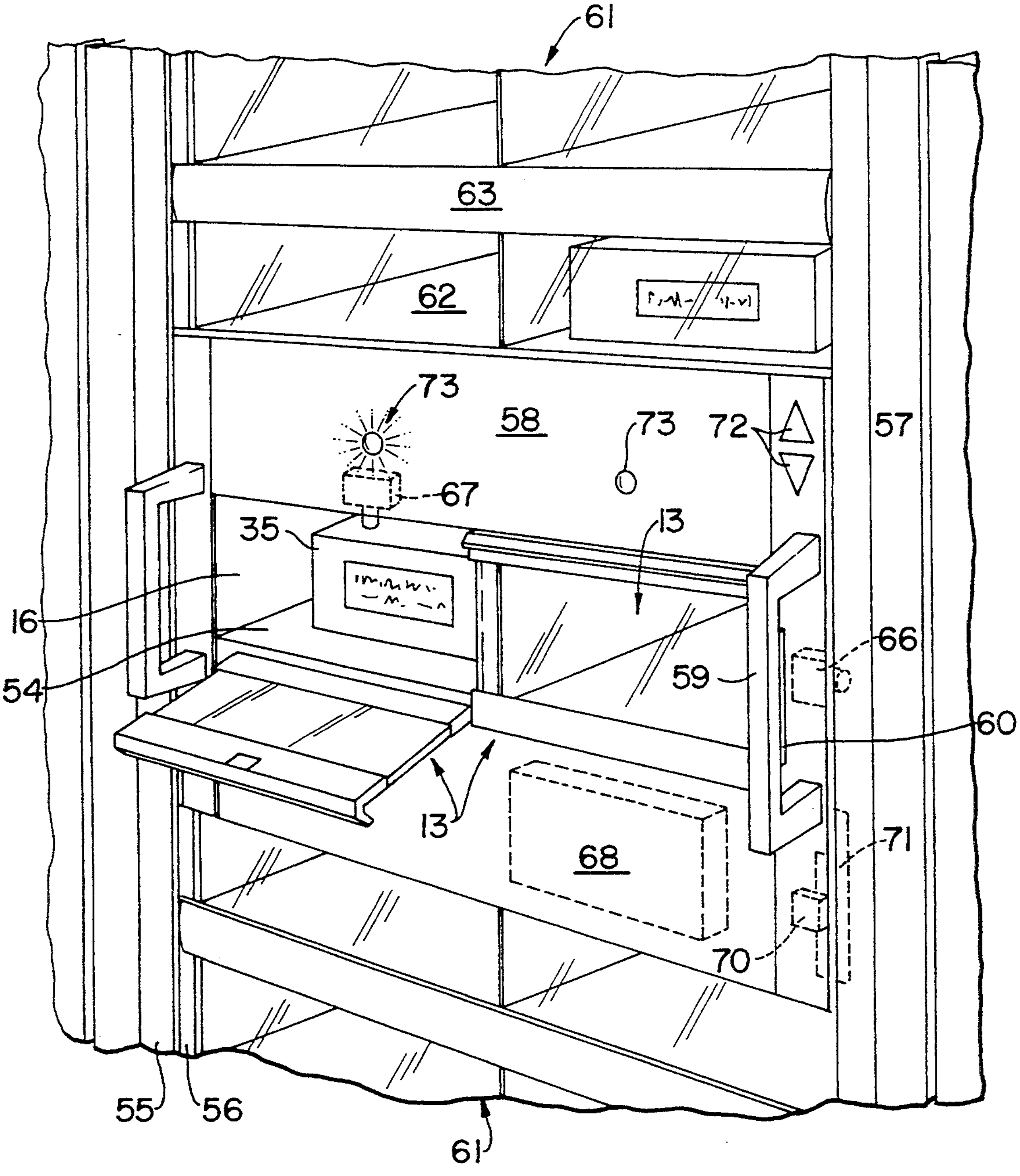
FIG. 7 is a detailed view of the embodiment of FIG. 6.

The storage units 50 to 52 contain a plurality of juxtaposed compartments 16, forming compartment rows 17. As shown in FIG. 7, the bottoms 54 of the compartments are relative to the inclined front face of the units, inclined slightly downwardly in order to urge articles 35 stored in the compartments away from the front of the bottoms 54, i.e., in a direction to prevent the articles 35 from falling out.

The compartments 16 are fixed in the units 50 to 52 for storing articles 35.

The storage units 50, 51 and 52 are preferably of different widths though they are of equal height. The compartments therein are different in size and number, but equal in each unit. So, for example, storage unit 50 has a large number of smaller compartments arranged in ten compartment rows, while unit 51, which is not as wide as unit 50, has ten rows of only two compartments in each row, and unit 52 has two relatively high compartments in a row and, therefore, only three or four rows of compartments.

At the lateral side of each unit 50 to 52 there is a guide 55 of U-shape with a substantially vertically-extending guide groove 56. In the guide 55 a delivery unit 57 is moveable vertically in order to be aligned with each compartment row 17. Each delivery unit contains a front panel 58 in which delivery doors 13 are hinged to be pivotable about a lower horizontal axis as shown in FIG. 7.

Each delivery unit 57 includes a plurality of doors equal to the number of compartments in each compartment row 17 of the unit 57, each of which can be individually opened.

The delivery unit 57 includes handles 59 extending therefrom for moving the unit 57, and include a trigger 60 which can be pressed by the operator in order to trigger the release of a lock 66 of the delivery unit 57.

Connected to the upper and lower rim of the delivery unit is a cover 61 constructed like a roller-shutter. The elements of this cover contain transparent strips 62, e.g., made of Plexiglas material or another transparent material, and non-transparent strips 63, e.g., aluminum profiles, having an upper and lower groove for receiving the edges of the transparent strips 63 therein. Transparent and non-transparent strips 62 and 63 are arranged in the cover in alternating sequence. They are sized to match the height of the rows. So, for example, in the units 50 and 51, one pair of transparent and non-transparent strips 62 and 63 cover the height of one compartment row. Accordingly, each compartment row is visible through its corresponding transparent strip 62.

The strips 62 and 63 are mounted on a chain or ribbon in the area of the guides 55, and are pivotable relative to each other such that the cover 61 can be guided around deflection wheels 64 which are rotatable around a horizontal axis and are situated behind the upper and lower front panel parts 65 of each unit 50–52. Each cover 61 is moveable separately from the cover 61 of an adjacent unit. Each cover 61, which is of roller-shutter type construction, is connected to itself on the backside of its corresponding storage unit 50–52 by flexible means, e.g., rubber ribbons, strips or bands, in order to provide tension to the cover.

Each delivery unit 57 includes a unit locking mechanism 66, and for each door 13, a door locking mechanism 67. The locking mechanisms 66 and 67 are electrically actuable, and controlled by an electronic control unit 68, which is in turn controlled by a central control 69, e.g., a computer, of a control unit 53. The delivery unit 57 contains a sensor 70 which cooperates with coding strips 71 which extend along the lateral sides of each storage unit 50–52 beneath the guides 55. The sensor 70, for example, is an active optical sensor for reading the coding strips 71, for producing a signal for identifying the compartment row with which the delivery unit is aligned.

The delivery unit 57 also has a direction indicator 72, similar to direction indicators for elevators, for showing in which direction the delivery unit 57 has to be moved in order to be aligned with a row in which a desired compartment is situated.

The delivery unit 57 also includes indicators 73, e.g., lamps, for each door for indicating whether the compartment aligned to the door is holding an article 35 or not.

The control unit 53 has a display 74, e.g., a computer monitor, the computer 69, a keyboard 75, a printer 76 and a shelf for catalogs 77 or like articles.

The operation of the embodiment of FIGS. 6 and 7 is similar to that described before except for the following.

In order to obtain a specific article, the user identifies the article visually through the transparent cover 61. The delivery unit 57 is then directed to the compartment row 17 containing the article by gripping the handles 59, and pressing the trigger 60. The trigger 60 does not directly release the delivery unit lock 66, but this is done electrically only if the computer 69 is switched on and is enabled to follow and store information relating to the actions requested by, for example, pressing the trigger 60. After aligning the delivery unit 57 with the row containing the desired article, the door indicator 73 indicates whether the compartment is validly filled. In a simple mode of operation, the user can now open the desired compartment wanted and take out the requested or desired article. This is then registered and stored in the computer.

Simultaneously with the moving of delivery unit 57, the display 74 indicates the content and status of all compartments passed by the delivery unit.

In another mode of use, the user can select a desired article by its identification number or name, or other code through the keyboard 75. The display shows immediately whether the article is available, and in which of the units 50 to 52 it is located. The direction indicator 72 of the respective unit shows in which direction the delivery unit must be moved in order to approach the row with the article wanted. The door indicator indicates which door is to be opened. The respective door is released by the doorlock 67, and the door can then be opened. There is a timing means included in the electronics which, if the door is not opened within a predetermined time limit, causes the door to be locked again. This permits canceling of an undesired, but mistakenly entered, operation.

Each action is stored in the memory of the computer 69, and the printer 76 prints out a receipt protocol for each delivery operation after the door 13 is again closed.

The computer 69 also contains memory, e.g., in the form of a disk drive, for storing all operations performed, and sends out automatically at a predetermined time, e.g., at night time when economical tariff of the telephone or other data lines is available, a report to the central station for debiting and reloading purposes. The control unit 69 also enables the user to order articles directly which are not contained in the apparatus by using the catalog 77. The ordered articles can then be delivered with the next refilling of the apparatus, and the computer 69 can provide information that articles ordered in this way should be available in the apparatus in the future.

For refilling purposes the same procedure can be used as for taking out the articles, namely, typing in the appropriate number, positioning the delivery unit, and opening the door. Through a special code entered the computer can note that this is a refilling operation. It is, however, also possible to open the from panel of the delivery unit for repair or other operations. The sub-control station 68 for each separate unit is situated in this area, and is easily accessible. The station 68 controls all functions of the door and delivery unit release mechanisms, the sensing of the positions through sensor 70, etc., and only provides the results to the control unit 53.

It will be noted that the embodiment of FIGS. 6 and 7 is, due to the fact that the compartments are stationary, very economical if the number of compartments are not too large within a given space. It is variable in the size of compartments due to the fact that different storage units can be aligned and combined into a complete apparatus by simply putting them adjacent to each other, and connecting them by electrical connections with the central control unit 53.

Having thus described the invention, the same will become better understood from the appended claims wherein it is described in a non limiting manner.

What is claimed is:

1. An apparatus for storing and delivering articles, comprising:

long-range transmission means;

storage means comprising a plurality of compartments for storing articles;

at least one delivery unit operatively connected to said transmission means, and the delivery unit having at least one delivery door arranged on a front side of the delivery unit;

positioning means for moving the delivery door relative to the plurality of compartments into a delivery position in which one of said plurality of compartments is in alignment with the at least one delivery door;

release means for releasing the delivery door for exposing a corresponding one of said plurality of compartments located behind the door; and signal generating means for generating signals representative of alignment of one of said plurality of compartments with the delivery position and the release of the door, and said long-range transmission means being for transmitting said signals to a data processing central unit remote from the delivery unit for recording door releases and delivery position alignments of said delivery unit and delivery door relative to individual ones of said plurality of compartments.

2. The apparatus according to claim 1, wherein said plurality of compartments are juxtaposed with respect to each other in a plurality of article compartment rows, and said compartment rows are arranged one on top of another.

3. The apparatus according to claim 1, wherein the compartments further comprise access openings arranged in a common, substantially vertically extending plane.

4. The apparatus according to claim 3, wherein the substantially vertically extending plane is slightly inclined with respect to a strictly vertical plane.

5. The apparatus according to claim 1, wherein said compartments have bottoms with the bottoms thereof downwardly inclined to a rear thereof away from a front opening of each of said compartments.

6. The apparatus according to claim 1, wherein the delivery unit comprises multiple delivery doors juxtaposed as a delivery door row, each door of said multiple delivery doors being separately openable.

7. The apparatus according to claim 1, wherein the plurality of compartments are arranged fixed in a housing, and the delivery unit is moveable relative to said housing.

8. The apparatus according to claim 7, wherein the delivery unit is moveable in a vertical direction, and is connected to moveable cover means for covering the plurality of compartments.

9. The apparatus according to claim 8, wherein the cover means is at least partially transparent.

10. The apparatus according to claim 8, wherein the cover means is constructed in the form of a roller-shutter.

11. The apparatus according to claim 7, further comprising guides located at two lateral sides of said housing for guiding the delivery unit.

12. The apparatus according to claim 11, wherein the guides are made up of transparent guiding strips and non-transparent guiding strips making up the cover means, and arranged in alternating sequence, with the transparent strips being wider than the non-transparent strips.

13. The apparatus according to claim 8, wherein the cover means is guided at the upper and lower ends of said housing by wheels which are rotatable around horizontally extending axes.

14. The apparatus according to claim 7, wherein the delivery unit is moveable manually after manual triggering of a delivery unit releasing mechanism, said releasing mechanism being releasable only if memory means, interconnected between the signal generating means and the long-range transmission means, is in an operating status for enabling said release.

15. The apparatus according to claim 1, wherein the signal generating means comprises coding means for cooperating with the delivery unit for producing position signals representing the position of the delivery unit relative to each individual row of a plurality of rows made up of a corresponding number of compartments of said plurality of compartments.

16. The apparatus according to claim 15, wherein the coding means comprises optically readable code surfaces, and at least one optical sensor for reading said optically readable code surfaces.

17. The apparatus according to claim 1, wherein said apparatus for storing and delivering article comprises a plurality of apparatus for storing a delivery articles, each as a storage unit, each storage unit comprising a corresponding plurality of said compartments and a delivery unit, each storage unit being of modular construction for being interconnected to other storage units electrically.

18. The apparatus according to claim 1, comprising at least one storage unit, said storage unit comprising of a plurality of said compartments and a delivery unit, and the apparatus further comprising a separate control unit having memory and the long-range transmission means, the control unit being of modular construction for being electrically connected to the storage units.

19. The apparatus according to claim 18, wherein the control unit comprises entry means for entering data and a display.

20. The apparatus according to claim 1, wherein the front of the delivery unit is openable for providing access to door release means and to an electronic control device comprising a part of the signal generating means.

21. The apparatus according to claim 1, further comprising a display element near each door for indicating a full or empty condition of a compartment of said plurality of compartments which is aligned with the door.

22. The apparatus according to claim 1, comprising a direction indicator for indicating a direction in which the delivery unit is to be moved to approach a desired compartment of said plurality of compartments, in which an article is contained, and which has been selected through use of entry means.

23. The apparatus according to claim 1, further comprising access duration control means for controlling the timing of release of the door.

* * * * *